(12) United States Patent
Hughes

(10) Patent No.: US 7,431,743 B2
(45) Date of Patent: Oct. 7, 2008

(54) COLORANT FOR FOLIAGE OF HUMIC AND/OR FULVIC ACID, AND DYE

(75) Inventor: Douglas John Hughes, Loganholme (AU)

(73) Assignee: Australian Agricultural Chemicals, Queensland (AU)

( * ) Notice: Subject to any disclaimer, the term of this patent is extended or adjusted under 35 U.S.C. 154(b) by 0 days.

(21) Appl. No.: 10/552,428

(22) PCT Filed: Apr. 1, 2004

(86) PCT No.: PCT/AU2004/000422

§ 371 (c)(1),
(2), (4) Date: Oct. 7, 2005

(87) PCT Pub. No.: WO2004/096920

PCT Pub. Date: Nov. 11, 2004

(65) Prior Publication Data

US 2006/0282961 A1 Dec. 21, 2006

(30) Foreign Application Priority Data

Apr. 30, 2003 (AU) .............................. 2003902064

(51) Int. Cl.
*D06P 1/39* (2006.01)
(52) U.S. Cl. .................................. 8/506; 8/636; 8/550
(58) Field of Classification Search .................... 8/636, 8/550, 506
See application file for complete search history.

(56) References Cited

U.S. PATENT DOCUMENTS

| 4,191,550 | A | * | 3/1980 | Hawkins et al. ................. 71/30 |
| 5,744,278 | A | * | 4/1998 | Ayaki et al. .............. 430/109.3 |
| 5,993,098 | A | * | 11/1999 | Osada ........................ 401/209 |
| 6,541,421 | B1 | * | 4/2003 | Forsyth et al. .............. 504/101 |
| 6,569,425 | B2 | * | 5/2003 | Drahos et al. ............. 424/93.46 |
| 2002/0182234 | A1 | * | 12/2002 | Riedel et al. ................ 424/401 |
| 2003/0118621 | A1 | * | 6/2003 | Heidenfelder et al. ....... 424/401 |
| 2004/0192551 | A1 | * | 9/2004 | Bessette ..................... 504/117 |

FOREIGN PATENT DOCUMENTS

| DE | 3619078 A1 | 12/1986 |
| JP | 357008272 | * 1/1982 |
| JP | 361106683 | * 5/1986 |
| JP | 61-281160 | 12/1986 |
| JP | 62148405 | * 7/1987 |
| JP | 05065425 | * 3/1993 |

OTHER PUBLICATIONS

"From Rovral to Chipco, but always Green" (http://www.bayer-escience.co.uk/ChipcoGreenStory.pdf) 2006.*

* cited by examiner

*Primary Examiner*—Lorna M. Douyon
*Assistant Examiner*—Amina Khan
(74) *Attorney, Agent, or Firm*—Kirk D. Houser; Eckert Seamans Cherin & Mellott, LLC

(57) ABSTRACT

The invention relates to a colorant composition comprising humic acid and/or fulvic acid and a water soluble dye. The invention in particular relates to a colorant composition to be used for turf.

16 Claims, No Drawings

COLORANT FOR FOLIAGE OF HUMIC AND/OR FULVIC ACID, AND DYE

FIELD OF THE INVENTION

The present invention relates to a colorant composition. In particular, the present invention relates to a colorant composition suitable for colouring foliage and in particular turf grass. Although the present invention will be described with particular reference to this application, it will be appreciated that the composition may find other applications and no limitation is intended thereby.

BACKGROUND OF THE INVENTION

Turf grasses are widely used in recreational areas, parks, golf courses, bowling greens, athletic fields and domestic lawns. There is a demand for turf to have a uniform green colour so as to provide a pleasing appearance. This is particularly so for televised sporting events where it is desirable that a playing field have a healthy looking and uniform green colour. However, under adverse conditions such as drought and frosts, grass can lose its natural colour and in some circumstances change to an undesirable appearance. Turf colorants that can impart a green colour to discoloured turf have been developed with a view to artificially returning a playing field to a desirable colour or to simply make the turf appear more robust and healthy. Green colorants are also used to colour sand and in particular, divot sand as used on golf courses.

A green colorant that is widely used commercially is a pigment based colorant comprising a water insoluble pigment suspended in an aqueous solution. In practice, application problems may be experienced when applying pigment based colorants. Such problems include blockage of application nozzles and equipment cleaning difficulties.

Other colorants for use in the agricultural industry are also available. Such colorants are based on water soluble dyes. As the dyes are water soluble, the above-mentioned application difficulties associated with pigment based colorants are generally not experienced. The dye based colorants typically contain blue or red dyes and are used as markers for spraying herbicides, insecticides and the like. Blue colorants are also used to impart a blue colour to water features. The blue dyes may also be used on turf but impart a blue colour, which is generally not considered desirable.

However, there are some concerns regarding repeated use of pigments on playing fields and the like for a number of reasons. First, there are potential toxicity problems to those spraying the dyes and those playing on, or otherwise using the field. Although pigments commonly used to colour turf are considered safe to human health, there are few, if any, studies on long term exposure of these chemicals. Still further, there may be potential environmental hazards associated with build up of these chemicals in the environment as a result of repeated spraying. Generally a respray is necessary whenever the grass is cut. In some cases, a playing field may be sprayed at weekly or fortnightly intervals immediately prior a match or game being played on the field.

It is therefore an object of the present invention to provide an alternative colorant composition that is suitable for use on turf or other suitable surfaces.

DESCRIPTION OF THE INVENTION

According to a first broad form of the invention there is provided a colorant composition comprising humic acid, fulvic acid or a mixture thereof and a water soluble dye.

The present inventor has surprisingly and unexpectedly discovered that by adding humic and/or fulvic acid to a colorant, the colour of the resulting composition may be intensified and/or modified.

Humic acids are the fraction of humic substances that are not soluble in water under acidic conditions (less than about 2) but are soluble at higher pH values. Fulvic acids are soluble under all pH conditions.

Humic acid and fulvic acid are typically available and used in the form of aqueous solutions. Alternatively, these materials are available in solid form such as powder or granules. Typically, the composition is prepared by combining the ingredients with water to provide a concentrated liquid solution. This solution may be diluted prior to use. Alternatively, the components may be mixed in dry form. The dry mixture may be dissolved to provide a concentrate for shipping and sale, or may be dissolved prior to use.

Preferred dyes for use in the composition of the present invention are anionic dyes. Whilst not wishing to be bound by theory it is believed that the anionic dyes are less likely to precipitate in the presence of anionic components of humic and/or fulvic acid salts.

Especially preferred dyes are those containing organic acid groups, e.g., sulfonic, sulfamic, phosphoric, carboxylic, etc., or their salts. Acid dyes are commonly alkali metal such as sodium or potassium, or ammonium salts of an organic acid. Preferred dyes are salts of sulfonic acids such as acid blue 62 (Sodium 1-amino-4-(cyclohexylamino)-9,10-dihydro-9,10-dioxoanthracene-2-sulphonate); acid blue 74 (Disodium 5,5'-(2-(1,3-dihydro-3-oxo-2H-indazol-2-ylidene)-1,2-dihydro-3H-indol-3-one)disulphonate); acid blue 1 (Hydrogen [4-[4-(diethylamino)-2',4'-disulphonatobenzhydrylidene] cyclohexa-2,5-dien-1-ylidene]diethylammonium, sodium salt); acid blue 185 (CAS 1330-39-8); acid blue 9 (Dihydrogen (ethyl)[4-[4-[ethyl(3-sulphonatobenzyl)]amino]-2'-sulphonatobenzhydrylidene]cyclohexa-2,5-dien-1-ylidene](3-sulphonatobenzyl)ammonium or disodium salt); acid green 1 (Trisodium tris[5,6-dihydro-5-(hydroxyimino)-6-oxonaphthalene-2-sulphonato(2-)-N5,O6]ferrate(3-) and acid green 50 (Hydrogen [4-[4-(dimethylamino)-a-(2-hydroxy-3,6-disulphonato-1-naphthyl)benzylidene]cyclohexa-2,5-dien-1-ylidene]dimethylammonium, monosodium salt) or mixtures of any two or more thereof. Other suitable colouring agents are the phthalocyanine pigments of which Copper phthalocyanine blue or Pigment blue 15 is an example.

Especially preferred are the acid blue dyes, of which a sample is mentioned above. Such blue dyes are often used to impart a blue colour to ponds and water features. Blue dyes are also used as marker dyes to assist in identifying which areas of vegetation have been sprayed with a herbicide, insecticide or the like. Blue dyes may also be used as bases for green colorants. A yellow dye such as tartrazine (acid yellow 23) may be combined with the blue to provide a desired green colour.

It will be appreciated that any combination of two or more colorants may also be used in the composition of the present invention. The selection and formulation of such colorants will depend upon the desired result. This may be determined by one of skill in the art.

The present inventor has also very surprisingly and unexpectedly discovered that the combination of humic and/or fulvic acid with a blue dye produces a green colorant without requiring the addition of further yellow dyes or colouring agents.

The relative amounts of humic and/or fulvic acid to the colorant may be varied depending upon the desired colour and end use. Suitably the composition may comprise between about 50:1 to about 1:30, preferably between about 30:1 to about 1:3 parts by weight of humic and/or fulvic acid and colorant. Similarly, the actual amounts of dye and humic and/or fulvic acid in the composition may be varied according to the nature of the dye, desired colour and end use. Suitably the composition is supplied in a concentrated form and diluted for application. Suitably a composition may include between about 10 to about 30 wt % humic and/or fulvic acid.

The composition may also include other one or more additives known in the art such as stabilizers, stickers, surfactants or other surface active agents, fertilizers, insecticides, fungicides, pesticides, herbicides, wetting agents and the like.

Preferably, the composition includes one or more fertilizers, typically one or more water soluble fertilizers. Suitable fertilizers, combinations and amounts thereof are known in the art of horticulture and in particular, turf management. Suitable fertilizers include nitrogen sources such as urea, ammonia sulfate, urea formaldehyde; phosphate and potassium. A preferred fertilizer is urea.

The composition may also include a source of iron in the form of iron sulfate or chelated iron such as ferric EDTA.

The composition may also include a surfactant that may assist the composition to adhere or stick to the grass.

Surfactants suitable for such use include alcohol ethoxylates, nonyl, phenyl ethoxylates, polyethylene/polypropylene block copolymers.

The present invention also relates to a method for imparting colour to foliage. The foliage is typically turf grass but may be any other suitable foliage.

According to a further broad form of the invention, there is provided a method of imparting a colour to foliage, the method including applying a composition of the first broad form to the foliage.

The composition may be applied by any suitable means known in the art, such as by spraying.

By way of example only, the present invention will now be described with reference to the following Examples.

A composition was prepared by mixing an aqueous solution of 120 kg humic and/or fulvic acid (calculated as dry humic and/or fulvic acid) with 7.5 kg of a dye known as "Brilliant Blue" with 1000 kg water. (It is believed that the brilliant blue contains the dye acid blue 9). The composition was sprayed onto a turf grass field at a rate of 0.2 L-1 L per 100 $m^2$ diluted in 2-40 L water. This equates to about 24 g to about 120 humic and/or fulvic acid per 100 m and 1.5 to 7.5 g dye. A preferred rate of application is 0.5-1 L per 100 $m^2$ diluted in 5-10 L water. A green colour was imparted to the field.

A further composition was prepared in the same manner but with the further addition of 150 kg urea and 35 kg ferric EDTA to the 1000 kg water. Comparative trials were conducted by using aqueous compositions comprising either humic and/or fulvic acid or dye on their own in the same amounts and application rates as used above. In both cases, no visible green colour was imparted to the field.

A further trial was conducted using a green paint conventionally used to colour a playing field. 90 kg of the paint was diluted in 1000 kg water before spraying as above.

It was observed that in the case of the composition of the invention and the commercially available green colorant, a green colour was imparted to the field. However, the composition of the invention achieved a similar colour intensity with significantly less colorant than that required using the conventional formulation.

Still further, it was surprisingly and unexpectedly observed that the composition of the invention imparted a green colour that was observed to be a far more natural colour and representative of a naturally green field. On the other far more natural colour and representative of a naturally green field. On the other hand, the conventional green paint imparted a colour that was observed to be somewhat artificial as compared with a natural grass colour. The present inventor is unaware of a commercially available green turf colorant that imparts a natural green colour. A further advantage of being able to impart a natural green colour to a field is that treated turf can more easily blend in with untreated turf. Such a situation may arise where there are patches of damaged turf to be repaired. Generally, with prior art compositions it is necessary to also spray untreated turf to provide a uniform green colour. This may not be necessary with the preferred composition of the invention.

Still further, the inventive composition was not observed to have any of the aforementioned application difficulties associated with the use of a pigment based colorant, i.e. clogging and/or blockage of applicator nozzles and the like. The present inventor is also unaware of a commercially available green turf colorant that is based on a dye as opposed to a pigment.

It may be seen that the composition of the present invention allows significantly less dye material to be used in order to impart a level of colour comparative to conventional formulations. This ability to decrease the levels of chemical colorants required can reduce potential health risks for workers applying the chemicals, can reduce the build up of chemical residues in the environment and further, due to the decreased amount of colorant can reduce costs. (Humic and/or fulvic acid being less expensive than the available colorants).

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

It will be appreciated that various changes and modifications may be made to the invention as described herein without departing from the spirit and scope thereof.

The claims defining the invention are as follows:

1. An aqueous green foliage colorant composition consisting of humic acid, fulvic acid, water and a water soluble acid blue dye.

2. An aqueous green foliage colorant composition consisting of humic acid, fulvic acid, water, a water soluble anionic acid blue dye, and optionally a water soluble fertilizer, a soluble surfactant and a source of iron.

3. The composition of claim 2 wherein the ratio of humic acid and fulvic acid to colorant is between about 50:1 to about 1:3 parts by weight.

4. The composition of claim 2, wherein said composition is in a form suitable for spray application to turf.

5. The composition of claim 2, wherein the source of iron is ferric EDTA.

6. The composition of claim 2, wherein the fertilizer is urea.

7. An aqueous green foliage colorant composition consisting of humic acid, fulvic acid, water and a water soluble acid blue dye and additives selected from the group consisting of surface active agents selected from alcohol ethoxylates, phenyl ethoxylates and polyethylene/polypropylene block copolmers, and fertilizers selected from ammonia sulfate, formaldehyde, phosphate, potassium and urea.

8. A method of imparting a colour to foliage, the method including applying a composition of claim 2 to the foliage.

9. The method of claim 8, wherein the foliage is turf grass.

10. The method of claim 9, wherein between about 24 to about 120 g humic and fulvic acid and between about 1.5 to about 7.5 g dye are applied per 100 m2 turf grass.

11. The method of claim 8, wherein the dye contains an organic acid group or a salt thereof.

12. The method of claim 8, wherein the dye is a salt of a sulfonic acid.

13. The method of claim 8, wherein the dye is selected from the group consisting of acid blue 62 (Sodium 1-amino-4-(cyclohexylamino)-9,10-dihydro-9,10 -dioxoanthracene-2-sulphonate); acid blue 74 (Disodium 5, 5'-(2 -(1, 3-dihydro-3-oxo-2H-indazol-2-ylidene)-1,2-dihydro-3H-indol-3-one) disulphonate); acid blue 1(Hydrogen [4-[4-(diethylamino)-2',4'-disulphonatobenzhydrylidene]cyclohexa-2,5 -dien-1-ylidene]diethylammonium, sodium salt); acid blue 185 and acid blue 9 (Dihydrogen (ethyl)[4-[4-[ethyl(3-sulphonatobenzyl)]amino]-2'-sulphonatobenzhydrylidene]cyclohexa-2, 5-dien-1-ylidene](3-sulphonatobenzyl)ammonium or disodium salt) or mixtures of any two or more thereof.

14. The method of claim 8, wherein the ratio of humic acid and fulvic acid to colorant is between about 50:1 to about 1:3 parts by weight.

15. The method of claim 8, wherein the water soluble fertilizer is present.

16. The method of claim 8, wherein the soluble surfactant is present.

* * * * *